US009169726B2

(12) United States Patent
Snedden et al.

(10) Patent No.: US 9,169,726 B2
(45) Date of Patent: Oct. 27, 2015

(54) METHOD FOR QUANTITATIVELY ASSESSING CONNECTIVITY FOR WELL PAIRS AT VARYING FREQUENCIES

(75) Inventors: John W. Snedden, Leander, TX (US); David M. Chorneyko, Kingwood, TX (US); Charlie S. Kim, Houston, TX (US); Neal L. Adair, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 688 days.

(21) Appl. No.: 13/392,440

(22) PCT Filed: Jul. 1, 2010

(86) PCT No.: PCT/US2010/040761
§ 371 (c)(1),
(2), (4) Date: May 23, 2012

(87) PCT Pub. No.: WO2011/049648
PCT Pub. Date: Apr. 28, 2011

(65) Prior Publication Data
US 2013/0042677 A1    Feb. 21, 2013

Related U.S. Application Data

(60) Provisional application No. 61/253,342, filed on Oct. 20, 2009.

(51) Int. Cl.
*E21B 47/00* (2012.01)
*E21B 43/00* (2006.01)
*E21B 49/00* (2006.01)

(52) U.S. Cl.
CPC ............... *E21B 47/00* (2013.01); *E21B 49/00* (2013.01); *G01V 2210/644* (2013.01); *G01V 2210/65* (2013.01); *G01V 2210/66* (2013.01)

(58) Field of Classification Search
USPC ................ 702/9, 11, 13, 14; 703/10; 166/50, 166/117.6, 242.1, 313
See application file for complete search history.

(56) References Cited

U.S. PATENT DOCUMENTS

| | | | |
|---|---|---|---|
| 4,327,290 A | 4/1982 | Plasek | |
| 5,040,414 A | 8/1991 | Graebner | |

(Continued)

FOREIGN PATENT DOCUMENTS

| | | |
|---|---|---|
| GB | 2145508 | 3/1985 |
| WO | WO 2007/007210 | 1/2007 |

(Continued)

OTHER PUBLICATIONS

Betancourt, Soraya S., Dubost, Francois X., Mullins, Oliver C., Cribbs, Myrt E., Creek, Jefferson L., Mathews, Syriac G.; "Predicting Downhole Fluid Analysis Logs to Investigate Reservoir Connectivity;" Dec. 4-6, 2007; International Petroleum Technology Conference; IPTC 11488; pp. 1-11.*

(Continued)

*Primary Examiner* — John Breene
*Assistant Examiner* — Christine Liao
(74) *Attorney, Agent, or Firm* — ExxonMobil Upstream Research Company, Law Dept.

(57) ABSTRACT

Method for quantitatively assessing connectivity for well pairs at varying frequencies. A time series of measurements (12) is chosen for each of the two wells such that the particular measurements will be sensitive to subsurface connectivity if it exists (11). The two time series may then be pre-processed by resampling to time intervals commensurate with response time between the two wells (13), detrending the measurements (14), and detecting and eliminating spiking noises (15). Then the time series are transformed to the frequency domain where coherence and phase between the two series are compared for varying frequencies (16). This comparison is used to make a determination of connectivity.

20 Claims, 7 Drawing Sheets

(56) References Cited

U.S. PATENT DOCUMENTS

| | | | |
|---|---|---|---|
| 5,159,833 A | 11/1992 | Graebner et al. | |
| 5,586,082 A | 12/1996 | Anderson et al. | |
| 5,600,318 A | 2/1997 | Li | |
| 5,757,663 A | 5/1998 | Lo et al. | |
| 5,798,982 A | 8/1998 | He et al. | |
| 5,835,882 A | 11/1998 | Vienot et al. | |
| 5,848,379 A | 12/1998 | Bishop | |
| 6,246,963 B1 | 6/2001 | Cross et al. | |
| 6,393,906 B1 | 5/2002 | Vityk et al. | |
| 6,514,915 B1 | 2/2003 | Beyer et al. | |
| 6,594,585 B1* | 7/2003 | Gersztenkorn | 702/14 |
| 6,661,000 B2 | 12/2003 | Smith et al. | |
| 6,754,588 B2 | 6/2004 | Cross et al. | |
| 6,810,332 B2 | 10/2004 | Harrison | |
| 6,826,483 B1 | 11/2004 | Anderson et al. | |
| 6,950,751 B2 | 9/2005 | Knobloch | |
| 6,980,940 B1 | 12/2005 | Gurpinar et al. | |
| 6,985,841 B2 | 1/2006 | Barroux | |
| 7,124,030 B2 | 10/2006 | Ellis | |
| 7,174,254 B2 | 2/2007 | Ellis | |
| 7,210,342 B1 | 5/2007 | Sterner et al. | |
| 7,249,009 B2 | 7/2007 | Ferworn et al. | |
| 7,251,566 B2 | 7/2007 | Wu et al. | |
| 7,280,932 B2* | 10/2007 | Zoraster et al. | 702/85 |
| 7,280,952 B2* | 10/2007 | Butler et al. | 703/10 |
| 7,297,661 B2 | 11/2007 | Beyer et al. | |
| 7,337,660 B2 | 3/2008 | Ibrahim et al. | |
| 7,344,889 B2 | 3/2008 | Kelemen et al. | |
| 7,387,021 B2 | 6/2008 | DiFoggio | |
| 7,395,691 B2 | 7/2008 | Sterner et al. | |
| 7,511,813 B2 | 3/2009 | Vannuffelen et al. | |
| 7,520,158 B2 | 4/2009 | DiFoggio | |
| 7,526,418 B2 | 4/2009 | Pita et al. | |
| 7,529,626 B1 | 5/2009 | Ellis | |
| 7,596,480 B2 | 9/2009 | Fung et al. | |
| 7,739,089 B2 | 6/2010 | Gurpinar et al. | |
| 7,996,198 B2 | 8/2011 | Swanson et al. | |
| 8,078,405 B2 | 12/2011 | Delorme et al. | |
| 8,370,122 B2* | 2/2013 | Walker et al. | 703/10 |
| 2002/0013687 A1 | 1/2002 | Ortoleva | |
| 2002/0049575 A1 | 4/2002 | Jalali et al. | |
| 2002/0067373 A1 | 6/2002 | Roe et al. | |
| 2002/0099504 A1 | 7/2002 | Cross et al. | |
| 2002/0120429 A1 | 8/2002 | Ortoleva | |
| 2004/0010374 A1* | 1/2004 | Raghuraman et al. | 702/13 |
| 2004/0148147 A1 | 7/2004 | Martin | |
| 2004/0210547 A1 | 10/2004 | Wentland et al. | |
| 2004/0220790 A1 | 11/2004 | Cullick et al. | |
| 2004/0254734 A1 | 12/2004 | Zabalza-Mezghani et al. | |
| 2005/0096893 A1 | 5/2005 | Feraille et al. | |
| 2005/0149307 A1 | 7/2005 | Gurpinar et al. | |
| 2005/0199391 A1 | 9/2005 | Cudmore et al. | |
| 2005/0209866 A1 | 9/2005 | Veeningen et al. | |
| 2005/0209912 A1 | 9/2005 | Veeningen et al. | |
| 2005/0234690 A1 | 10/2005 | Mainguy et al. | |
| 2005/0256647 A1 | 11/2005 | Ellis | |
| 2006/0014647 A1 | 1/2006 | Beyer et al. | |
| 2006/0041409 A1 | 2/2006 | Strebelle et al. | |
| 2006/0047489 A1 | 3/2006 | Scheidt et al. | |
| 2006/0052938 A1 | 3/2006 | Thorne et al. | |
| 2006/0092766 A1 | 5/2006 | Shelley et al. | |
| 2006/0235667 A1 | 10/2006 | Fung et al. | |
| 2006/0235668 A1 | 10/2006 | Swanson et al. | |
| 2006/0241867 A1 | 10/2006 | Kuchuk et al. | |
| 2006/0265204 A1 | 11/2006 | Wallis et al. | |
| 2006/0277012 A1 | 12/2006 | Ricard et al. | |
| 2006/0277013 A1 | 12/2006 | Bennis et al. | |
| 2006/0282243 A1 | 12/2006 | Childs et al. | |
| 2006/0287201 A1 | 12/2006 | Georgi et al. | |
| 2006/0293872 A1 | 12/2006 | Zamora et al. | |
| 2007/0005253 A1 | 1/2007 | Fornel et al. | |
| 2007/0011646 A1 | 1/2007 | Chrisochoides et al. | |
| 2007/0013690 A1 | 1/2007 | Grimaud et al. | |
| 2007/0016389 A1 | 1/2007 | Ozgen | |
| 2007/0143024 A1 | 6/2007 | Michel et al. | |
| 2007/0156377 A1 | 7/2007 | Gurpinar et al. | |
| 2007/0162235 A1 | 7/2007 | Zhan et al. | |
| 2007/0219724 A1 | 9/2007 | Li et al. | |
| 2007/0219725 A1 | 9/2007 | Sun et al. | |
| 2007/0242564 A1 | 10/2007 | Devi | |
| 2007/0265778 A1 | 11/2007 | Suter et al. | |
| 2008/0040086 A1 | 2/2008 | Betancourt et al. | |
| 2008/0059140 A1 | 3/2008 | Salmon et al. | |
| 2008/0065362 A1 | 3/2008 | Lee et al. | |
| 2008/0097735 A1 | 4/2008 | Ibrahim et al. | |
| 2008/0099241 A1 | 5/2008 | Ibrahim et al. | |
| 2008/0147326 A1 | 6/2008 | Ellis | |
| 2008/0173804 A1 | 7/2008 | Indo et al. | |
| 2009/0071239 A1 | 3/2009 | Rojas et al. | |
| 2009/0259405 A1* | 10/2009 | Spears | 702/14 |
| 2011/0040536 A1 | 2/2011 | Levitan | |
| 2011/0191080 A1 | 8/2011 | Klie | |
| 2011/0251796 A1 | 10/2011 | Waid et al. | |

FOREIGN PATENT DOCUMENTS

| | | |
|---|---|---|
| WO | WO 2007/063442 | 6/2007 |
| WO | WO 2008/100614 | 8/2008 |
| WO | WO 2009/094064 | 7/2009 |
| WO | WO 2010/008647 | 1/2010 |

OTHER PUBLICATIONS

Bahorich, Mike, Farmer, Steve; "3-D seismic discontinuity for faults and stratigraphic features: The coherence cube"; The Leading Edge; 1995; pp. 1053-1058.*

Wu, Zhaohua, Huang, Norden, Long, Steven, Peng, Chung-Kang; "On the trend, detrending, and variability of nonlinear and nonstationary time series;" 2007; The National Academy of Sciences of the USA; vol. 104, No. 38; pp. 1-10.*

Ainsworth, R.B., (2005), Sequence Stratigraphic-Based Analysis of Depositional Architecture—A Case Study From A Marginal Marine Depositional Setting, Petroleum Geoscience, vol. 11, pp. 257-276.

Allen, J.R.L., (1978), Studies In Fluviatile Sedimentation; An Exploratory Quantitative Model For The Architecture Of Avulsion-Controlled Alluvial Sites, Sedimentary Geology, vol. 21; 2, pp. 129-147.

Barton, M., et al., Understanding Hydrocarbon Recovery in Deepwater Reservoirs; Modeling Outcrop Data In The Third Dimension, 2004, AAPG, vol. 13, pp. 11.

Bradley, D.A., et al. (1968), "Improving Prudhoe Bay Pulse-Test Data by Processing with Fourier Transforms," SPE 18124, 1968 SPE Annual Tech. Conf. and Exh., Oct. 2-5, pp.

Chorneyko, D.M. (2006), Real-Time Reservoir Surveillance Utilizing Permanent Downhole Pressures—An Operator's Experience, SPE 103213, 2006 SPE Annual,Tech. Conf. and Exh., Sep. 24-27.

Cooley, J.W., et al. (1965), "An algorithm for the machine calculation of complex Fourier series," *Math. Comput.* 19, pp. 297-301.

Elshahawi, H., et al., (2000), Correcting For Wettability And Capillary Pressure Effects On Formation Tester, Oct. 1-4, SPE 63075.

Firoozabadi, A., et al., (1998), Surface Tension Of Water-Hydrocarbon Systems At Reservoir Conditions, Journal of Canadian Petroleum Technology, Reservoir Engineering, vol. 41.

Gainski, M., et al., (2008), the Schiehallion Field: Detection Of Reservoir Compartmentalisation and Identification Of New Infill Targets Using 4D Seismic Surveys and Dynamic Production Data, Reservoir Compartmentalization [Online], Mar. 5-6, pp. 32. Retrieved from the Internet: URL:http//www.geolsoc.org.uk/webdav/site/GSL/shared/pdfs/events/abstracts/Reservoir_AbstractBook.pdf, pp. 32.

Hollaender, F., et al. (2002), Harmonic Testing for Continuous Well and Reservoir Monitoring, SPE 77692, 2002 SPE Annual Tech. Conf. and Exh, Sep. 29-Oct. 2, 2002, pp.

James, W.R., et al., (2004), Fault-Seal Analysis Using A Stochastic Multi-Fault Approach, pp. 885.

Jansen, F.E., et al. (1997), Application of Wavelets to Production Data in Describing Inter-Well Relationships, SPE 38876, 1997 SPE Annual Tech. Conf. and Exh., Oct. 5-8, 1997, pp.

(56) References Cited

OTHER PUBLICATIONS

Justwan, H., et al., Characterization Of Static and Dynamic Reservoir Connectivity For The Ringhorne Field, Through Integration of Geochemical and Engineering Data: Reservoir Compartmentalization.

Justwan, H.K., et al., (2008), Unraveling Dynamic Fluid Connectivity Through Time-Lapse Geochemistry—From Example From the Ringhorne Field, Norway, AAPG Int'l Conf and Exhibition, Cape Town, South Africa.

King, P.R., (1990), The Connectivity and Conductivity Of Overlapping Sand Bodies, In, Buller, A.T, et al, Eds, North Sea Oil and Gas Reservoirs; II, Proceedings Of The North Sea Oil And Gas Reservoirs Conference [Book, Conference Document], pp. 353-362.

Lame, D.K., et al., (2006), Connectivity Of Channelized Reservoirs: A Modeling Approach, Petroleum Geoscience, vol. 12, pp. 291-308.

Lescoffit, G., et al., (2005), Quantifying The Impact Of Fault Modeling Parameters On Production Forecasting For Clastic Reservoirs, AAPG Hedberg Series, No. 2, pp. 137-149.

McCain, W.D., Jr., (1991), Reservoir-Fluid Property Correlations—State Of The Art, SPERE, pp. 266.

Manzocchi, T., et al., (2008), Sensitivity Of The Impact Of Geological Uncertainty On Production From Faulted And Unfaulted Shallow-Marine Oil Reservoirs: Objectives And Methods, Petroleum Geoscience, vol. 14, pp. 3-15.

Olsen, S. et al. (2005), "Automatic Filtering and Monitoring of Real-Time Reservoir and Production Data," SPE 96553, 2005 SPE Annual Tech. Conf. and Exh., Oct. 9-12, 2005, pp.

Rai, H. (2005), "Analyzing Rate Data from Permanent Downhole Gauges," Report submitted to Dept. of Petroleum Engineering, Stanford University, 70 pgs.

Richards, B., et al., (2008), Reservoir Connectivity Analysis Of A Complex Combination Trap Terra Nova Field, Jeanne d'Arc Basin, Newfoundland, Canada, Reservoir Compartmentalization, London Geological Society, pp. 59.

Sales, J.K., (1997), Seal Strength Vs. Trap Closure; A Fundamental Control On The Distribution Of Oil And Gas, In: Seals, Traps, And The Petroleum System, AAPG, vol. 67, pp. 57-83.

Schlumberger, Managing Uncertainty In Oilfield Reserves, Middle East Well Evaluation Review, (2004), vol. 12.

Snedden, J.W. et al. (1988), "Storm and Fairweather Combined-Flow on the Central Texas Continental Shelf," *Jour. Sed. Pet.* 58, pp. 580-595.

Snedden, J.W., et al. (2007), Reservoir Connectivity: Definitions, Examples And Strategies, IPTC 11375.

Sumpter, L., et al., (2008), Early Recognition Of Potential Reservoir Compartmentalization, Reservoir Compartmentalization, London Geological Society, pp. 84.

Sweet, M.L., et al., (2007), Genesis Field, Gulf Of Mexico: Recognizing Reservoir Compartments On Geologic And Production Timescales In Deep-Water Reservoirs, AAPG, vol. 91, pp. 1701-1729.

Vrolijk, P.J., et al., (2005), Reservoir Connectivity Analysis—Defining Reservoir Connections And Plumbing, SPE 93577-MS.

\* cited by examiner

METHOD FOR QUANTITATIVELY ASSESSING CONNECTIVITY FOR WELL PAIRS AT VARYING FREQUENCIES

CROSS REFERENCE TO RELATED APPLICATION

This application is the National Stage entry under 35 U.S.C. 371 of PCT/US2010/040761, that published as WO 2011/049648 and was filed on 1 Jul. 2010, which claims the benefit of U.S. Provisional Application No. 61/253,342, filed on 20 Oct. 2009, each of which is incorporated herein by reference, in its entirety, for all purposes.

FIELD OF THE INVENTION

The invention relates generally to the field of hydrocarbon prospecting and production, and more particularly to a method for quantitatively assessing connectivity for well pairs at varying frequencies.

BACKGROUND OF THE INVENTION

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section should be read in this light, and not necessarily as admissions of prior art.

Downhole instrumentation in oil and gas wells continues to evolve, with more diverse measurement capabilities being installed in an ever-increasing number of fields. Permanent downhole monitoring (PDM) gauges, measuring pressure and temperature, provide nearly instantaneous signals from the subsurface reservoir. The oil and gas industry have started to collect immense quantities of downhole information, used primarily for reservoir surveillance. This same information provides valuable information about the internal "connectivity" of the reservoir, that is, the ease with which fluids communicate through complex compartments and pathways to reach the borehole. However, interpreting the connectivity signal and separating it from white noise, man-made artifacts, and equipment issues remains challenging. In addition, simple qualitative, often visual, comparisons between producing wells and injector-producer pairs are inadequate to properly characterize the intricate, multi-tiered connectivity inherent to both sandstone and carbonate reservoirs.

The simplest method, and what is commonly done, to determine inter-well connectivity from permanent downhole pressure data is to plot or visually overlay the pressures from different wells versus time and look for dependent pressure behavior. For example, if one well is shut-in, yet the buildup pressures in this well are declining while another well is on production, it may be inferred the wells are in hydraulic communication and thus connected. If the visual technique does not work, the next option is to build a reservoir model and history match individual well bottom hole pressures. The objective is to see if connectivity between wells has to be present for a valid history match, and to estimate the degree of connectivity.

While simple in theory, the visual comparison technique is often difficult to apply in practice because the bottom hole pressures may be affected by many other transient factors such as rate changes and communication from more than one well. Visual inspection may not be able to isolate the subtle or independent impact of another well's production or injection on the permanent downhole pressure record. The history matching technique is time consuming and non-unique.

There is a need for a fast and reliable technique to determine inter-well connectivity from permanent bottom hole pressure data. Wells with permanent down hole gauges are now common (Chorneyko, 2006). The volume of data (up to 1 pressure reading per second being recorded) and the amount of time required for processing (filter, de-noise, and compress) and analysis are factors that limit use of the data. Early and accurate diagnoses of reservoir connectivity will improve the quality and predictability of full-field simulations. The present inventive method fulfills this need and deals with the complicating factors at work.

SUMMARY OF THE INVENTION

In one embodiment, a method is disclosed for quantitatively assessing connectivity between two wells in a subsurface region for the purpose of planning or managing production of hydrocarbons from the subsurface region, comprising comparing spectral content of a time series of measurements from one well to spectral content of a time series of measurements from the other well.

BRIEF DESCRIPTION OF THE DRAWINGS

Disclosed aspects and their advantages will be better understood by referring to the following detailed description and the attached drawings in which.

Figure 1:
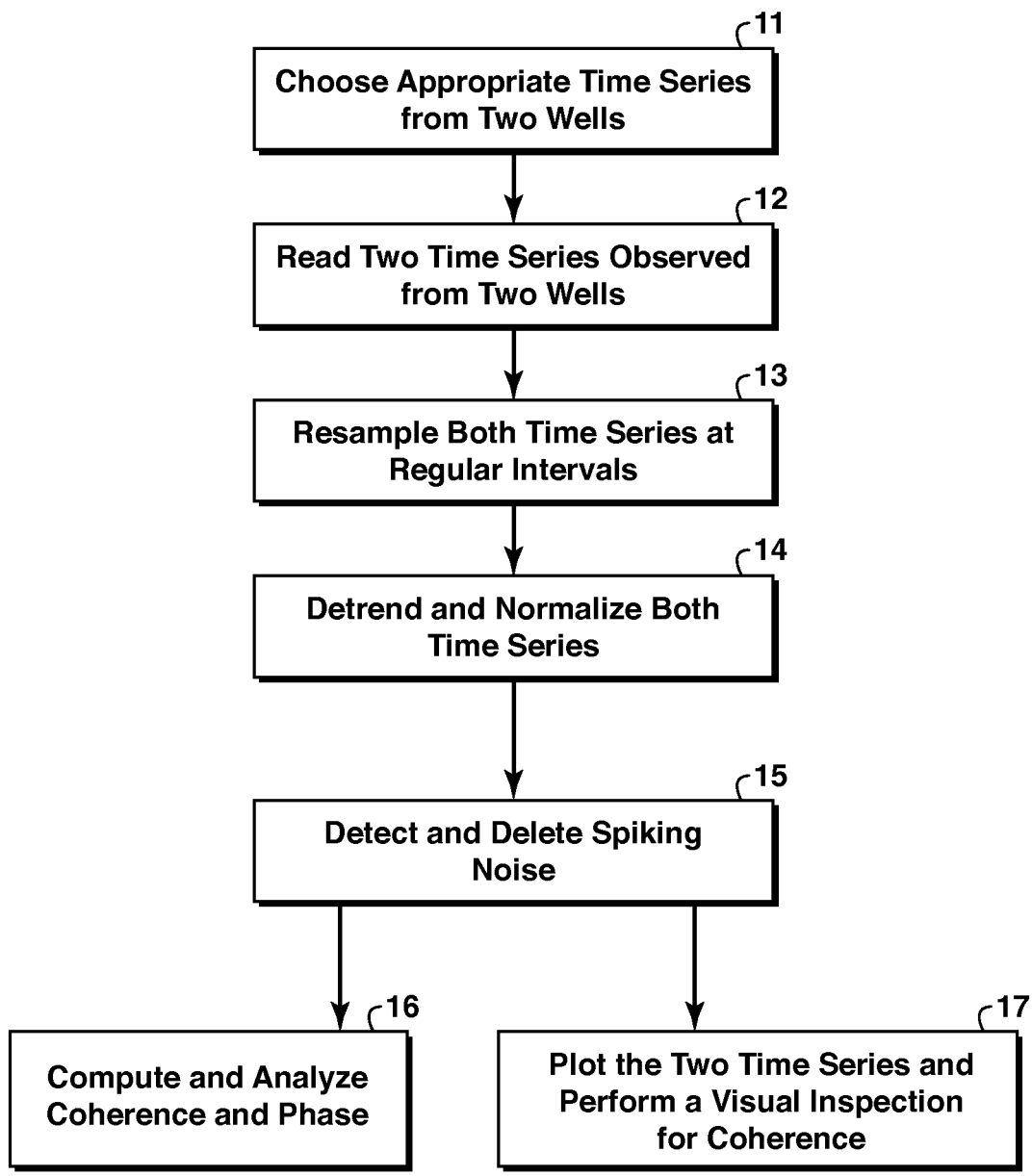
FIG. 1 is a diagram of basic steps for analysis of connectivity between two wells.

Example embodiments will now be described. To the extent that the following is specific to a particular embodiment or a particular use, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

At the outset, and for ease of reference, certain terms used and their meanings as used in this context are set forth. To the extent a term used herein is not defined below, it should be given the broadest definition persons in the pertinent art have given that term as reflected in at least one printed publication or issued patent.

As used herein, the term "connectivity" refers to a measure of the hydraulic communication (or lack thereof) between points within a geologic zone. Connectivity is closely related to the reservoir internal geometry and is commonly a primary factor controlling hydrocarbon production efficiency and ultimate recovery.

The term "time series" means measurements of some physical parameter as a function of discrete time, i.e. at some pre-determined sampling time intervals. Analysis of a single time series is made using standard published methods for decomposing the data into a spectrum of cycles of different lengths (see, for example, Cooley and Tukey, 1965). Coherence and phase spectral analysis, referred to herein as "cross-spectral analysis," involves comparing decomposed cycles in two time series.

Some portions of the detailed description that follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. A procedure, step, logic block, process, or the like, is conceived and understood herein to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, various actions could occur concurrently, substantially in parallel, and/or at substantially different points in time.

There have been isolated examples of transformation of dynamic reservoir engineering information into the frequency domain. Bradley and Allen (1968) used Fourier transforms to process surface pressures in two observation wells that were part of a traditional pulse testing program. Jansen and Kelkar (1987) showed how the wavelet transformation can decompose production rate data into a frequency component that can be used for analysis of inter-well relationships. Unlike Fourier transforms, the wavelet functions do not have infinite duration and they allow users to divide a complicated signal into several components and process the components individually. Hollaender, Hammond, and Gringarten (2002) looked at the practical aspects of using periodic rate variations for testing oil wells. Harmonic well testing has many desirable characteristics but it requires much longer testing sequences than conventional testing for the same information. Olsen and Nordtvedt (2005) applied automated wavelet techniques for filtering and compressing real-time pressure data. Signal processing techniques have been applied to process pressure data from permanent downhole gauges in individual wells. None of these applications involve permanent downhole gauges and rates in multiple wells, as is discussed herein.

In one aspect, cross-spectral analysis is used to provide a way to compare multiple time series in order to deduce linkages. The cross-spectral analysis is used to investigate similarity, or coherence, between two time series at varying frequency. For example, Snedden et al. (1988) disclose collecting real time data of wind, tides, waves, and currents and using cross-spectral analysis in order to understand the forcing mechanisms on continental shelves and the deep ocean. Indications of similarity or dissimilarity between well pairs' pressure histories are used to infer subsurface connectivity between the two wells. PDM data may readily be collected on a nearly continuous basis, and these accumulated metrics form one or more time series datasets, e.g. a single well or multiple wells.

According to the disclosed techniques, pairs of wells can be screened for hydraulic connectivity. The flow chart of FIG. 1 shows basic steps of an example embodiment. At step 11, appropriate time series from two wells are chosen. Care should be taken to select two monitor signals that can be potentially linked only by subsurface reservoir communication. For example, if two wells are commingled into the same production entity, they will show coherence because they are connected at the surface facilities. If the reservoir is multi-layered and completed in many layers, the determination of connectivity from coherence spectrum may be difficult because not all layers may be in communication. Permanent downhole monitoring (PDM) gauges generally provide downhole temperature and pressure measurements. (Recording readings at time intervals from such gauges is an example of step 12.) These devices are "permanent" in the sense that they are maintained for the life of the borehole and are different than temporary tools measuring pressure, etc. in the subsurface for short spans of time (e.g. Repeat Formation Testers, Modular Dynamic Testers, etc.) prior to well completion. Typical measurements from PDM's are in digital form and the sampling intervals are in the order of seconds. Since the response time (i.e. the delayed effect) between two wells would typically be on the order of tens of minutes or hours, both time series preferably are re-sampled at larger time intervals (step 13). Then, one or more of several other pre-processing techniques may optionally be used to make the two time series more suitable for a cross-spectral coherence analysis. These can include steps such as detrending and normalizing the two time series (step 14), eliminating buildup sequences, eliminating spurious spikes (step 15), and applying low-pass/band-pass filters. Spurious spike elimination is explained below, and the other pre-processing techniques are well known to practitioners in the technical field. At step 16, coherence and phase spectra between two time series are computed and analyzed to evaluate fluid connectivity between two wells. Alternatively or additionally, at step 17 coherence may be determined or estimated by plotting the two time series and performing a visual inspection for coherence. Further details of some of the method steps follow next.

Choice of Two Time Series (Step 11):

Different types of data suitable for reservoir connectivity analysis when displayed in time sequence form include downhole pressure, flow rate, and injection rate at injection wells and production wells. One can use downhole pressure and flow rate from one well to test the effectiveness of the cross spectral analysis and preprocessing steps. Or, one can use downhole pressure or flow rate in one well and injection rate in another well to evaluate the connectivity. Yet, another example is to apply shut-in's (periods when a well is not flowing) in one well and compare flow rates and/or downhole pressure changes on the other wells. Whatever the choice of the time series from the two wells, the final analysis (step 16) of the hydraulic connectivity should preferably include known reservoir configuration, possible effect of other wells in the vicinity, effect of surface equipment, and other man-made ambient noises that might be still present in the two time series. This is because existence of coherence in the cross-spectral analysis does not necessarily mean hydraulic connectivity.

Sampling Intervals and Method of Resampling the Various Time Series (Step 13):

Typical measurements obtained from PDM are in digital form and the sampling intervals are on the order of seconds. From the viewpoint of determining internal connectivity of a reservoir, a pressure or a flow rate change in an injection well would affect a bottom-hole pressure at a production well in time scales of hours and days instead of seconds, i.e. the effect would be delayed by that much time. Therefore, raw measured pressure data should be preprocessed and re-sampled at a coarser and regular sampling interval before being subjected to a cross spectrum analysis. Based on the observation that an injection pressure has a cumulative effect on production wells, one aspect of the present techniques uses average injection pressures at sampling intervals as injection pressures at the sampling times. Compared to this strategy, a normal re-sampling method would compute pressures at designated sampling times by interpolating the closest two measured pressures. Re-sampling pressure data or flow rate data using a sampling rate in the range of 20 minutes to a few hours may give good results for determining connectivity between wells. The sampling interval can be as large as 24 hours. This data reduction of two to three orders of magnitude can make the computation time as well as the storage of pressure data more manageable.

Detrending and Normalizing Two Time Series (Step 14):

Even though the cross spectral analysis technique does not require two time series to be stationary, it is recommended to detrend the two signals. To do this, a linear trend for each time series is estimated and the estimated linear trend is eliminated from each time series. Even though normalization is not required for an accurate cross spectral analysis, each time series is preferably normalized, for example by dividing each time series by its standard deviation. Such normalization is may assist in allow proper visual inspection of the two time series.

Figure 2:
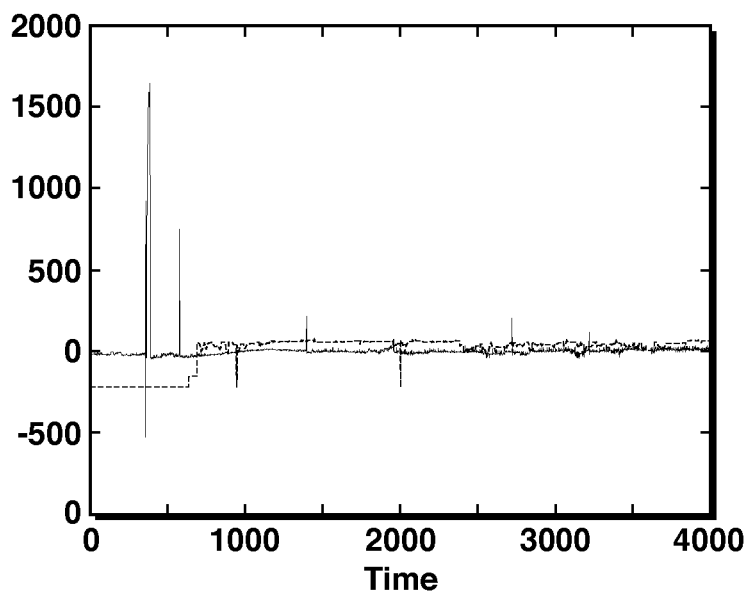
FIG. 2 is a plot of an injection well pressure in gray (dashed line) and production well pump intake pressure (PIP) (solid line) in black, where pressures are normalized and zero meaned with a new standard deviation.
Figure 3:
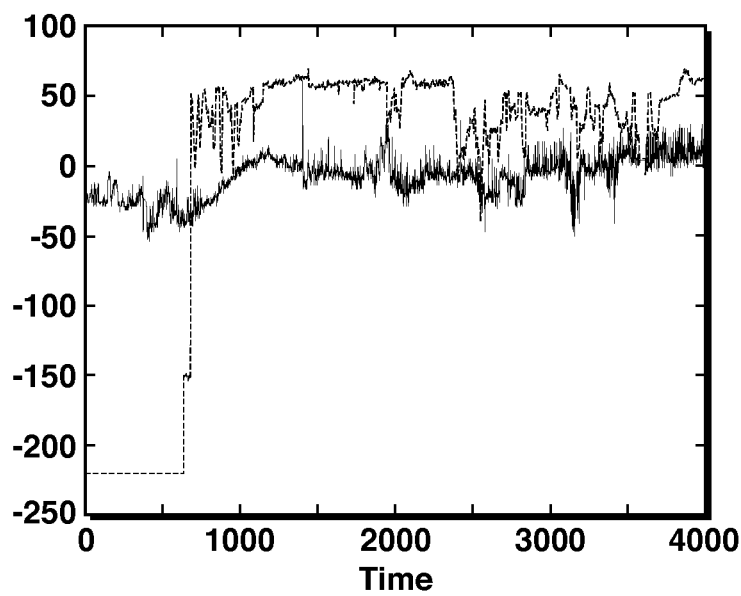
FIG. 3 is a plot of an injection well pressure (dashed line) and production well PIP in black after spurious spike noises are removed from the pressure records.
Figure 4:
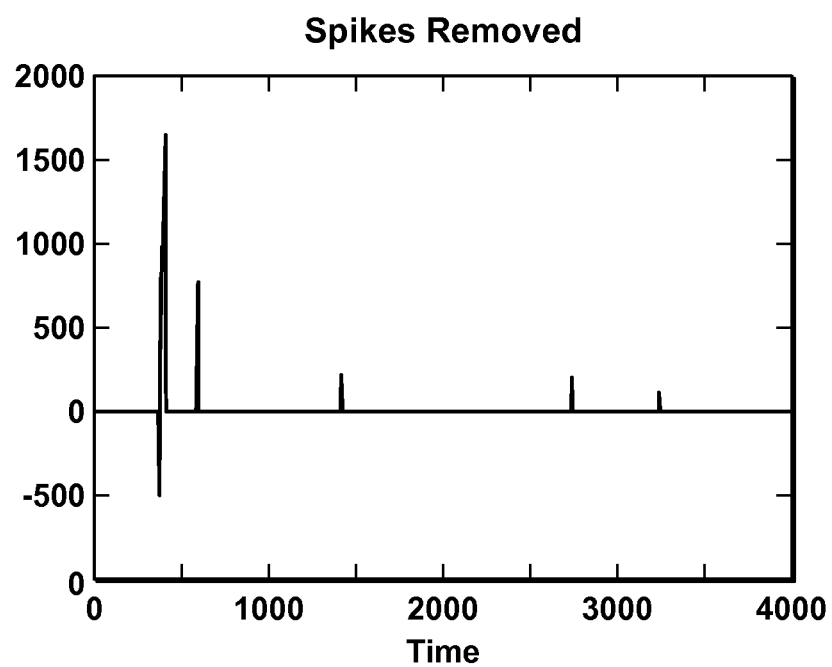
FIG. 4 is a plot of spike noises removed from the injection pressures in FIG. 2.
Figure 5:
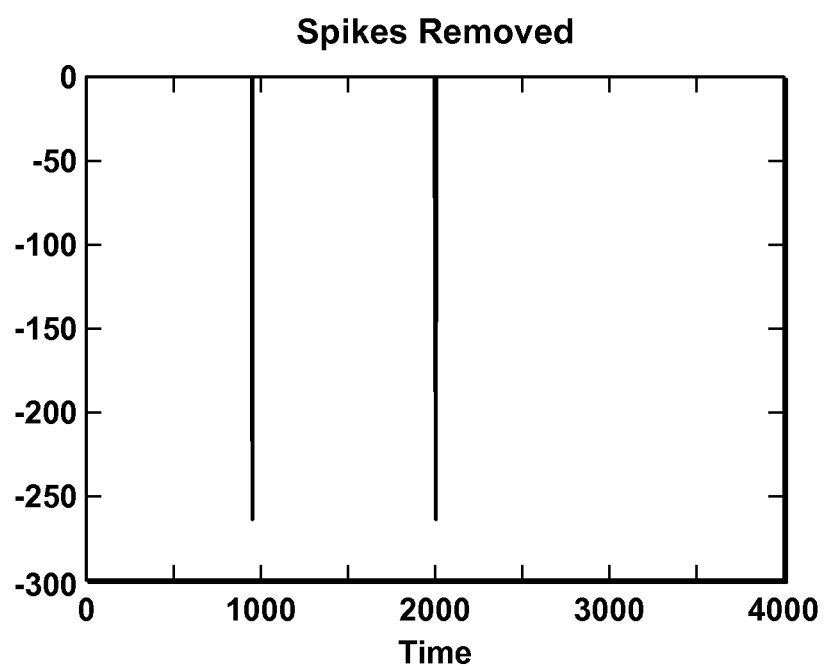
FIG. 5 is a plot of spike noises removed from production well pump intake pressures in FIG. 2.

Spiking Noise Reduction by Using a Nonlinear Filter (Step 15):

Injection rates and/or bottom-hole pressures are routinely corrupted by non-geologic and artificial, (e.g. man-made or facility-related) spurious noises. One of the most disturbing types of noises is a spike noise as shown in FIG. 2, where the amplitudes of the spike noises in injection pressure (dashed line) and pump intake pressure (solid line) are so large that variations in pressure are hard to observe. In one aspect, a nonlinear filter is used to detect and eliminate these spike noises. This nonlinear filter is of length 2N+1, where N is an integer. For a single time series p(i), i=0 to M, this nonlinear filter computes a median value m(i) of p(i), where the median filter window length is 2N+1. If the magnitude of the difference between m(i) and p(i) is greater than a predetermined threshold value, p(i) is considered a spurious spike and p(i) is replaced by m(i). Otherwise, p(i) is not considered to be a spike and keeps its value. FIG. 3 shows the injection pressure (dashed line) and the pump intake pressure (solid line) when all the spurious spikes are removed by using this nonlinear filter. FIGS. 4 and 5 show identified and removed spikes from injection pressure and pump intake pressure respectively. Other preprocessing steps may be developed to further improve the reservoir connectivity analysis capability afforded by the disclosed cross spectral analysis method.

Cross Spectrum Analysis (Step 16)

Cross spectral analysis may be used to determine relationships between two time series as a function of frequency. Given a two time series $X_t=(x_{t1},x_{t2})^T$, with a covariance matrix $\Gamma(h)=E(X_{t+h,i}X_{t,j})$, for i, j=1, 2, and h is a time delay, then the spectral density matrix is defined as follows:

$$S(w) = \frac{1}{2\pi}\sum_{h=-\infty}^{\infty} \Gamma(h)e^{-ihw} = ((s_{11}(h), s_{21}(h))^T, (s_{12}(h), s_{22}(h))^T)$$

where $S_{21}(w)=S_{12}^*(w)$, and $S_{12}(w)$ is a cross spectrum:

$$s_{12}(w) = \frac{1}{2\pi}\sum_{h=-\infty}^{\infty} E(x_{t+h,1}x_{t,2})e^{-ihw}$$

The cross spectrum can be separated into amplitude spectrum and phase spectrum:

$$s_{12}(w)=A(w)e^{i\Phi(w)}, \text{ with } \Phi(w)\in(-\pi,\pi]$$

The coherence is defined as:

$$K(w) = \frac{|s_{12}(w)|}{(s_{11}(w)s_{22}(w))^{1/2}}, \text{ with } 0 \leq K \leq 1$$

This coherence measures the linear relation between the two time series $X_t=(x_{t1},x_{t2})^T$ at frequency w. Direct calculation from the preceding definitions of autocorrelation and cross-correlation of the two series is not practical, but a standard method for estimating the coherence spectrum K(w) and phase spectrum $\Phi(w)$ from two time series $X_t=(x_{t1},x_{t2})^T$ may be used. Alternatively, any other method for estimating a coherence and phase spectrum may be used.

Figure 8:
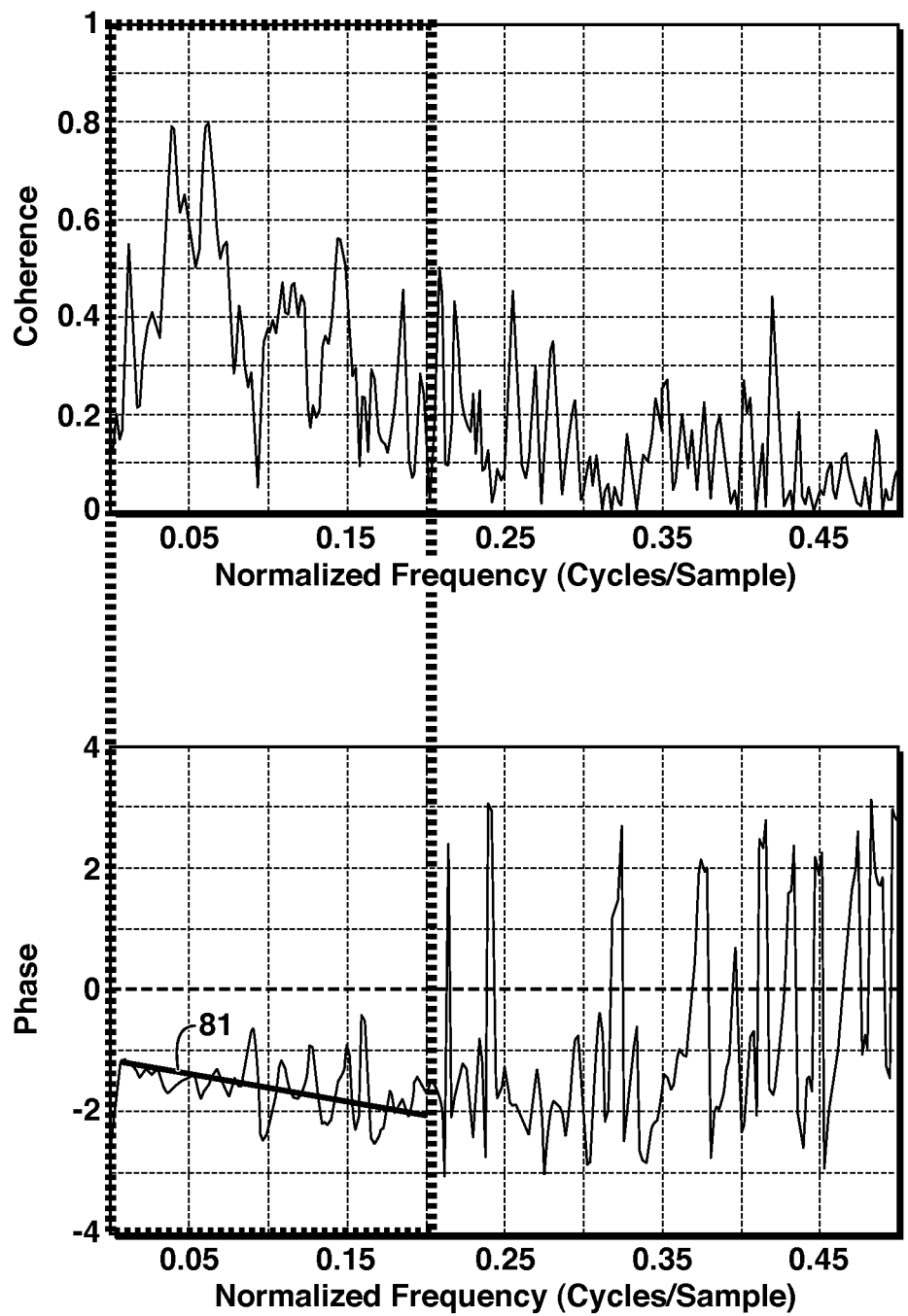
FIG. 8 is a plot of coherence spectrum (upper chart) and phase spectrum (lower chart) for two time series of well C-20 injection rates and well C-04 bottomhole pressures.

Example coherence and phase spectra are shown in FIG. 8. In a coherence spectrum plot, the strength of the coherency between two time series, values from 0 to 1.0, is plotted for a normalized frequency range of 0.0 to 0.5: A normalized frequency has units of cycles per second. Therefore, the coherency spectrum shows the coherency between two time series at different frequencies. Compared to this coherency spectrum, a correlation coefficient of two time series could be considered as an "average" coherency between two time series at all frequencies. The coherency plot in FIG. 8 indicates that the two time series of an injector well C-20 injection rate and bottom hole pressures in a producer well C-04 have relatively high coherence at low frequency range (between normalized frequency of 0.025 and 0.075) since the coherency values in this range of normalized frequency is high, i.e. greater than 0.5. There have been previous attempts at converting a single time series of dynamic reservoir information into frequency domain (Fourier transformation) or scale space domain (Wavelet transform). However, none of them attempted to compute and view correlations between two time series at different frequencies or in different scale space.

Example

Figure 6:
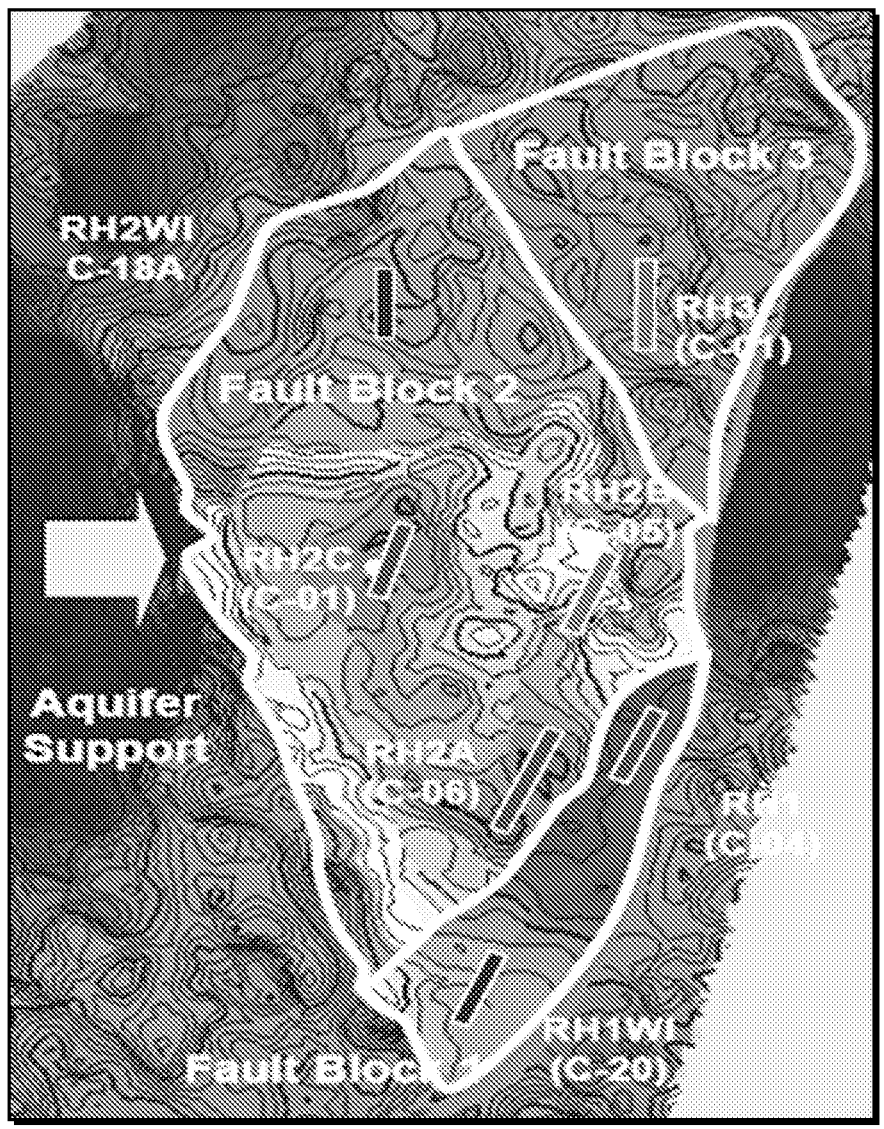
FIG. 6 is a map of a subsurface field with three fault compartments.

In some of its embodiments, the disclosed method involves examination of coherence spectra between a time series of a rate signal (either production or injection) in one well and a time series of pressures from a permanent downhole gauge in another well. If the rate and pressure signals show coherence, they are considered to be hydraulically connected, absent any indications to the contrary from other available information. An example connectivity analysis was conducted for two pairs of injection and production wells that were located in three fault blocks of a producing field as shown in FIG. 6.

Figure 7:
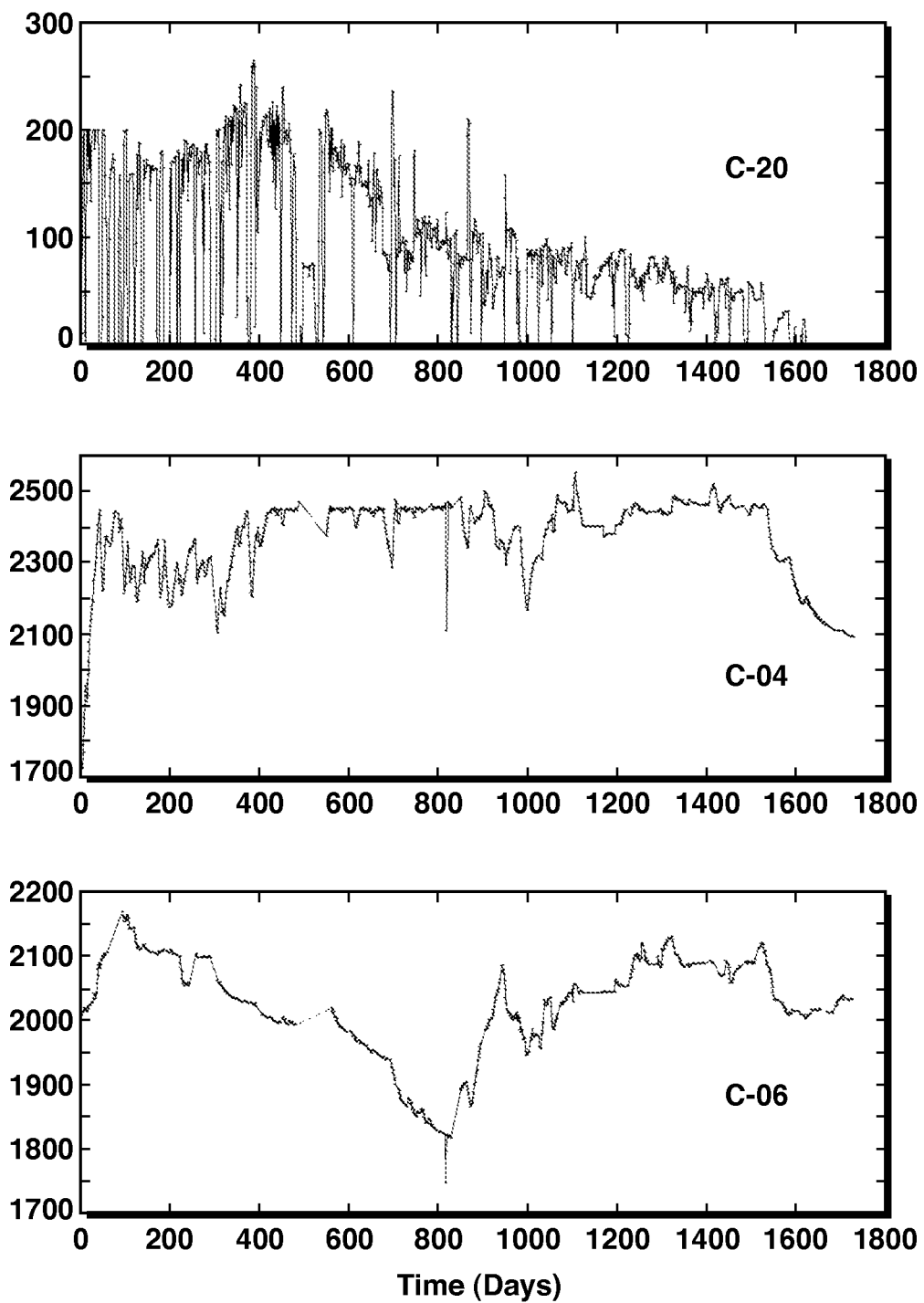
FIG. 7 compares charts of daily injection rate at well C-20 and bottom hole pressures at wells C-04 and C-06.

The degree of reservoir connectivity between the field producer wells C-04 and C-06 was unknown. Injector well C-20 was injecting water into the same fault block as well C-04. The question is whether producer well C-06 is connected to the injection well C-20 even though it is located in another fault block: fault block 2. FIG. 7 shows the daily injection rate at well C-20 and bottom hole pressures at wells C-04 and C-06. Coherence spectra were examined for two pairs of data:
1. injection rate for C-20 and the bottomhole pressure for C-04, and
2. injection rate for C-20 and the bottomhole pressure for C-06.

Figure 9:
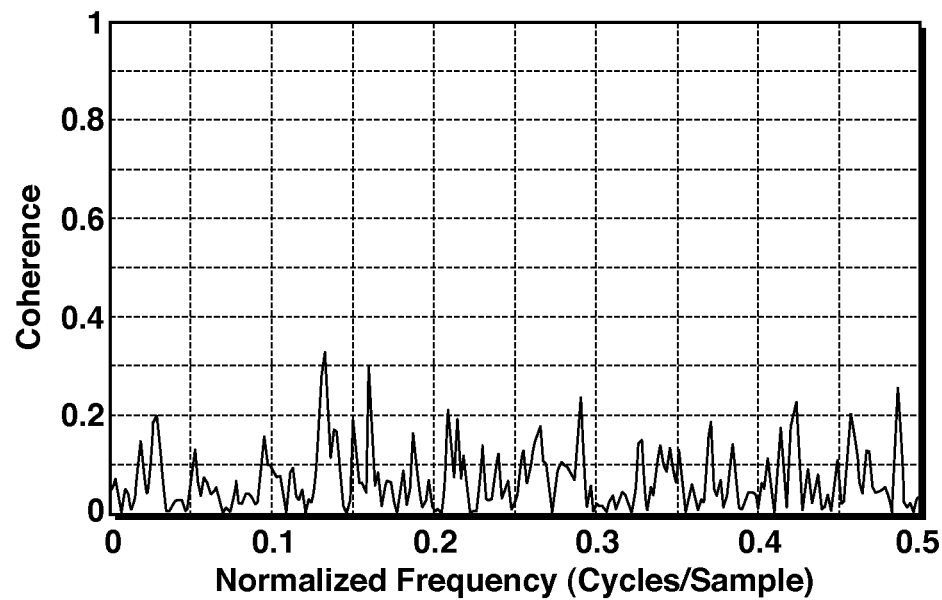
FIG. 9 is a plot of coherence spectrum (upper chart) and phase spectrum (lower chart) for two time series of well C-20 injection rates and well C-06 bottomhole pressures.
Figure 9:
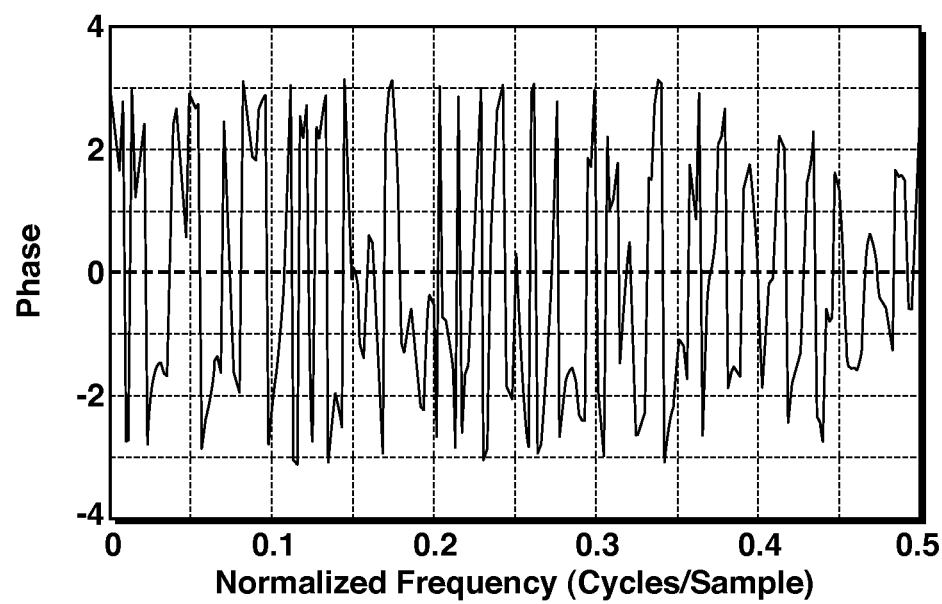

Injection and/or bottom-hole pressures are routinely corrupted by non-geologic and man-made or facility-related spurious noises such as choke changes at production wells and malfunction or deterioration of pumping capacities, etc. One type of discontinuity in the correlation between injector and producer is a buildup or shut-in of production at the producer. A step in the initial data processing used in this example is to screen out all buildup pressures at the producing wells. The results of the cross spectral analysis for the producing field example is shown below in the coherence (upper graph) and phase (lower graph spectra of FIG. 8 (data pair 1) and FIG. 9 (data pair 2). Well C-04 (FIG. 8) shows significant coherence (up to 0.8) with the C-20 injection rates compared to (FIG. 9) well C-06 (up to 0.3), especially at normalized frequencies less than 0.2 cycles/sample. Sloping line 81 in the phase spectrum of FIG. 8 is a running mean average of the phase spectrum over that part of the normalized frequency range. The zero phase line is shown in both FIGS. 8 and 9. Zero phase means that neither time series is leading or lagging the other.

The connectivity information derived using the disclosed methodologies and techniques may be outputted to a printout or display and/or may be used to perform a variety of hydrocarbon management activities, such as hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The foregoing is directed to particular embodiments of the disclosed aspects for the purpose of illustration. It will be apparent, however, to one skilled in the art, that many modifications and variations to the embodiments described herein are possible. All such modifications and variations are intended to be within the scope of the present invention, as defined in the appended claims. Persons skilled in the art will also readily recognize that in preferred embodiments at least some of the steps in the present inventive method are performed on a computer, i.e. the invention is computer implemented.

REFERENCES

Bradley, D. A., and Allen, T. T.: "Improving Prudhoe Bay Pulse-Test Data by Processing with Fourier Transforms," paper SPE 18124 presented at the 1968 SPE Annual Technical Conference and Exhibition, Houston, Tex., Oct. 2-5, 1968.

Chorneyko, D. M.: "Real-Time Reservoir Surveillance Utilizing Permanent Downhole Pressures—An Operator's Experience," paper SPE 103213 presented at the 2006 SPE Annual Technical Conference and Exhibition, San Antonio, Tex., September 24-27, 2006.

Cooley, James W., and Tukey, John W., "An algorithm for the machine calculation of complex Fourier series," *Math. Comput.* 19, 297-301 (1965).

Hollaender, F., Hammond, P. S., and Gringarten, A. C., "Harmonic Testing for Continuous Well and Reservoir Monitoring," paper SPE 77692 presented at the 2002 SPE Annual Technical Conference and Exhibition, San Antonio, Tex., September 29-Oct. 2, 2002.

Jansen, F. E., and Kelkar, M. G., "Application of Wavelets to Production Data in Describing Inter-Well Relationships," paper SPE 38876 presented at the 1997 SPE Annual Technical Conference and Exhibition, San Antonio, Tex., Oct. 5-8, 1997.

Olsen, S. and Nordtvedt, J.-E., "Automatic Filtering and Monitoring of Real-Time Reservoir and Production Data," paper SPE 96553 presented at the 2005 SPE Annual Technical Conference and Exhibition, Dallas, Tex., Oct. 9-12, 2005.

Snedden, J. W., D. Nummedal, and A. F. Amos, "Storm and Fairweather combined-flow on the central Texas continental shelf," Jour. Sed. Pet. 58, 580-595 (1988).

The invention claimed is:

1. A method for quantitatively assessing connectivity between two wells in a subsurface region for the purpose of planning or managing production of hydrocarbons from the subsurface region, comprising:
   obtaining for each of at least two wells a time series of measurements characterizing a physical or operating condition of the well as a function of discrete time from a downhole monitoring gauge disposed within the well;
   resampling each of the time series of measurements at a different time interval;
   comparing, in a computer system, spectral content of a first time series of measurements from a first well of at least two wells to spectral content of a second time series of measurements from a second well of at least two wells, wherein said comparison between wells of spectral content of time series of measurements comprises:
   (a) obtaining for each of the wells the time series of measurements characterizing the physical or operating condition of the well, said physical or operating condition being selected to show coherence between the two wells only if the wells are hydraulically connected through the subsurface region;
   (b) estimating either cross-spectral coherence or both cross-spectral coherence and phase of the two time series, wherein coherence or phase is estimated by a mathematical computation of cross-spectral coherence or phase, yielding numerical values of coherence or phase at varying frequencies; and
   (c) quantitatively assessing connectivity between the two wells using the estimated coherence or the estimated coherence and phase; and
   based on the comparison, determining connectivity between the at least two wells; and
   based on the connectivity determination, managing production of hydrocarbons from the subsurface region using the well connectivity assessment.

2. The method of claim 1, further comprising resampling the two time series with sampling intervals based on estimated response time between the two wells, and using the two resampled time series in the estimating of coherence or phase.

3. The method of claim 2, further comprising detrending and normalizing the two time series before the estimating of coherence or phase.

4. The method of claim 3, further comprising detecting and deleting spiking noises in the two time series of measurements before the estimating of coherence or phase.

5. The method of claim 1, wherein the physical condition of the well is pressure or temperature.

6. The method of claim 1, wherein the operating condition of the well is injection rate, production rate, or flow rate.

7. The method of claim 2, wherein the resampling comprises determining new sampling time intervals, said new intervals being longer than time intervals in the two time series of measurements, and the measurements are sampled using an average of values in a sampling interval.

8. The method of claim 4, wherein detecting and deleting spiking noises in the time series of measurements comprises applying a time window to the series, said time window containing a plurality of time intervals and associated measurement values of the series, including a central measurement value located at the window's middle, then computing a median value of the measurements within the window and replacing the central measurement value by the median value if the difference between the median value and the central measurement value exceeds a pre-determined threshold value.

9. The method of claim 8, wherein the window includes 2N+1 time intervals of the measurement series, where N is an integer.

10. A method for quantitatively assessing connectivity between two wells in a subsurface region for the purpose of planning or managing production of hydrocarbons from the subsurface region, comprising:
 (a) obtaining for each of the two wells from a downhole monitoring gauge disposed within the well a time series of measurements characterizing a physical or operating condition of the well as a function of discrete time, said physical or operating conditions being selected to show coherence between the two wells only if the wells are hydraulically connected through the subsurface region;
 (b) pre-processing the two time series of measurements by performing one or more of:
  resampling the two time series with sampling intervals based on estimated response time between the two wells;
  detrending and normalizing the two time series; and
  detecting and deleting spiking noises in the two time series of measurements;
 (c) estimating either coherence, or both coherence and phase, between the two pre-processed time series, wherein coherence or phase is estimated by a mathematical computation of cross-spectral coherence or phase, yielding numerical values of coherence or phase at varying frequencies;
 (d) assessing connectivity, with a computer system, between the two wells using the estimated coherence or using both the estimated coherence and phase; and
 (e) managing production of hydrocarbons from the subsurface region using the well connectivity assessment.

11. The method of claim 10, wherein coherence is estimated by plotting the two time series and performing a visual inspection.

12. A method for quantitatively assessing connectivity between two wells in a subsurface region for the purpose of planning or managing production of hydrocarbons from the subsurface region, comprising:
 obtaining for each of at least two wells a time series of measurements characterizing a physical or operating condition of the well as a function of discrete time from a downhole monitoring gauge disposed within the well;
 resampling each of the time series of measurements at a different time interval;
 comparing, in a computer system, spectral content of a first time series of measurements from a first well of at least two wells to spectral content of a second time series of measurements from a second well of at least two wells, wherein said comparison between wells of spectral content of time series of measurements comprises:
  (a) obtaining for each of the wells the time series of measurements characterizing the physical or operating condition of the well, said physical or operating condition being selected to show coherence between the two wells only if the wells are hydraulically connected through the subsurface region;
  (b) estimating either cross-spectral coherence or both cross-spectral coherence and phase of the two time series, wherein estimating cross-spectral coherence and phase of the two time series comprises transforming autocorrelation and cross-correlation of the two time series to frequency domain, then from that, determining coherence and phase of the two series at a plurality of frequencies to produce a coherence spectrum and a phase spectrum; and
  (c) quantitatively assessing connectivity between the two wells using the estimated coherence or the estimated coherence and phase; and
 based on the comparison, determining connectivity between the at least two wells; and
 based on the connectivity determination, managing production of hydrocarbons from the subsurface region using the well connectivity assessment.

13. The method of claim 12, further comprising resampling the two time series with sampling intervals based on estimated response time between the two wells, and using the two resampled time series in the estimating of coherence or phase.

14. The method of claim 13, further comprising detrending and normalizing the two time series before the estimating of coherence or phase.

15. The method of claim 14, further comprising detecting and deleting spiking noises in the two time series of measurements before the estimating of coherence or phase.

16. The method of claim 12, wherein the physical condition of the well is pressure or temperature.

17. The method of claim 12, wherein the operating condition of the well is injection rate, production rate, or flow rate.

18. The method of claim 13, wherein the resampling comprises determining new sampling time intervals, said new intervals being longer than time intervals in the two time series of measurements, and the measurements are sampled using an average of values in a sampling interval.

19. The method of claim 15, wherein detecting and deleting spiking noises in the time series of measurements comprises applying a time window to the series, said time window containing a plurality of time intervals and associated measurement values of the series, including a central measurement value located at the window's middle, then computing a median value of the measurements within the window and replacing the central measurement value by the median value if the difference between the median value and the central measurement value exceeds a pre-determined threshold value.

20. The method of claim 19, wherein the window includes 2N+1 time intervals of the measurement series, where N is an integer.

* * * * *